United States Patent
Kaushal et al.

(10) Patent No.: US 7,253,411 B2
(45) Date of Patent: Aug. 7, 2007

(54) RECONFIGURABLE DETECTOR ARRAY OF RESISTANCE BOLOMETERS

(75) Inventors: Tej Paul Kaushal, Malvern (GB); Paul Antony Manning, Malvern (GB); John Peter Gillham, Malvern (GB)

(73) Assignee: QinetiQ Limited, Farnborough, Hants (GB)

( * ) Notice: Subject to any disclaimer, the term of this patent is extended or adjusted under 35 U.S.C. 154(b) by 97 days.

(21) Appl. No.: 10/503,312

(22) PCT Filed: Jan. 31, 2003

(86) PCT No.: PCT/GB03/00430

§ 371 (c)(1),
(2), (4) Date: Aug. 2, 2004

(87) PCT Pub. No.: WO03/067874

PCT Pub. Date: Aug. 14, 2003

(65) Prior Publication Data

US 2005/0067556 A1 Mar. 31, 2005

(30) Foreign Application Priority Data

Feb. 2, 2002 (GB) .................................. 0202506.2

(51) Int. Cl.
*G01J 5/24* (2006.01)

(52) U.S. Cl. ..................................... 250/338.1; 250/332
(58) Field of Classification Search ............. 250/208.1, 250/208.2, 338.1, 332
See application file for complete search history.

(56) References Cited

U.S. PATENT DOCUMENTS

| | | | |
|---|---|---|---|
| 5,021,663 A * | 6/1991 | Hornbeck | 250/338.4 |
| 5,129,595 A | 7/1992 | Thiede et al. | |
| 5,229,609 A | 7/1993 | Delteil et al. | |
| 5,382,977 A * | 1/1995 | Kozlowski et al. | 348/300 |
| 5,541,654 A | 7/1996 | Roberts | |
| 5,952,659 A * | 9/1999 | Yoneyama et al. | 250/338.4 |
| 6,255,638 B1 * | 7/2001 | Eraluoto et al. | 250/208.1 |
| 6,801,258 B1 * | 10/2004 | Pain et al. | 250/208.1 |
| 2002/0003571 A1 * | 1/2002 | Schofield | 348/148 |
| 2006/0232674 A1 * | 10/2006 | Cochran | 348/164 |

* cited by examiner

*Primary Examiner*—Thanh X. Luu
*Assistant Examiner*—Tony Ko
(74) *Attorney, Agent, or Firm*—Nixon & Vanderhye P.C.

(57) ABSTRACT

An Array of detectors can be configured to be read as separate detectors, or to be connected into larger groups, e.g. groups of four (a 2×2 array). This allows the formation of a relatively high definition image, and a much faster formation of a lower resolution image. This may be used with in an automobile to control deployment of safety airbags in accordance with a drivers position relative to the airbags. Preferably the array is a 64×64 array of thermal detectors.

18 Claims, 5 Drawing Sheets

64x64 pixels

32x32 pixels

Arrangement of Pixels and Switches

Arrangement for operation at full resolution

Arrangement for operation at 1/4 resolution

Arrangement for operation at 1/9 resolution

RECONFIGURABLE DETECTOR ARRAY OF RESISTANCE BOLOMETERS

This application is the US national phase of international application PCT/GB03/00430, filed 31 Jan. 2003, which designated the US and claims priority to GB Application No. 0202506.2 filed 2 Feb. 2002. The entire contents of these applications are incorporated herein by reference.

This invention relates to a reconfigurable detector array, specifically but not exclusively an x, y array of thermal detectors each detector forming a pixel.

Such an array is usefully arranged in the focal plane of an imaging system to provide a thermal Image of a scene of interest, e.g. the monitoring of rooms, paths or parking areas. Thermal imagers are useful because they can use natural radiation without addition illumination: this is particularly useful at night. Thermal imaging normally operates in the radiation bands between 3-14 µm. Other infra red wavelengths, and visible wavelengths arrays may be used by the present invention.

Some applications of infrared imaging can call for changes in frame rate or sensitivity in real time. An example of this is in the detection of head position for the correct deployment of vehicle airbags in an accident. In the time leading up to the accident, it is important to locate the head of the occupant in three dimensions and, during the accident, it is important to track the motion of the head. The acquisition task can be a relatively slow one, but may require a high sensitivity to ensure that the boundaries of the head are properly acquired. Conversely, during the accident, the position of the head must be tracked fast to ensure that the correct air bag is fired at the correct time.

Current thermal imagers usually have fixed readout rates and numbers of pixels. Averaging of succeeding frames of data is a common method of improving the signal-to-noise ratio (in an ideal system, the ratio improves with the square root of the number of frames added). Some visible band camcorders also allow adjacent pixels to be added, trading spatial resolution for sensitivity. Random access is also possible in some devices to enable smaller sub-sets of the focal plane to be read out in a faster time. Other arrangements for connecting individual elements together are described in GB-2332585A, WO-97/21080-A1. U.S. Pat. No. -5229609, WO-00/51345-A1, U.S. Pat. Nos. 5,129,595, and 5,541,554.

In currently available devices, the adding of successive frames of data and adjacent pixels is achieved in the camera processing rather than on the focal plane.

Air bag control systems currently in the market use accelerometers to control as many as six air bags to protect the occupants in an accident. The optimum timing and degree of inflation of each bag must be varied to ensure the best protection. Relying on acceleration readings alone does not take into account the position of the occupants and errors can occur. The bags may inflate too close the person, or the bag may have deflated before the person reaches it. Failure to inflate the correct bag may also leave the person vulnerable.

A visible imager will require a wide dynamic range to allow for both full tropical sunlight through an open sunroof and twilight. It will require an active illumination system at night.

A thermal imager will operate by day or by night as the human head emits radiation that it can image. However, there will be times when the apparent temperature of the interior parts of the car close to the occupant (headrest, seatback etc) are close to or the same as the temperature of the occupant's head. In this latter case, the sensitivity of the imager may have to be increased to be certain of acquiring the head position correctly.

The above problem is solved, according to this invention, by connecting several separate detectors together as required and keeping each detector separate at other times.

According to this invention a reconfigurable detector array comprises an array of detectors (4, 14, 15), characterised in that the detector array comprises a plurality of switchable connections (S, a, b, c, d) capable of connecting together separate detectors therein into at least one larger group of detectors, wherein, in use, the plurality of switchable connections are configurable such that the number of detectors comprising the at least one larger group is variable, and so as to enable separate detectors to be read individually or the at least one larger group of detectors to be read.

Preferably, the plurality of switchable connections are configured so as to ensure that, in use, the electrical impedance of the at least one larger group of detectors is the same as that of a single detector.

Advantageously, the at least one larger group of detectors comprises a plurality of sub-groups of detectors, the switchable connections being configured such that, in use, each sub-group comprises a plurality of detectors connected together electrically in series and the plurality of sub-groups are connected together electrically in parallel.

Preferably the array is arranged on a substrate. The substrate may carry electronic circuitry, amplifiers, switches etc, for processing the outputs of each detector and for reconfiguring the array into e.g. groups of four (2×2), nine (3×3), or sixteen (4×4) etc. detectors without changing the effective impedance.

The array may include optical means for directing a scene onto the detectors. The array may comprise an x by y array of detectors; the values of x or y may be in the range 24 to 96 inclusive.

For an array of thermal detectors e.g. resistance bolometers, the array and substrate with electronic circuitry is preferably encapsulated to isolate the detectors from ambient conditions.

A 64×64 pixel focal plans might provide 100 mK sensitivity at standard frame rate, e.g. 30 Hz. The detectors are small resistors and the readout circuit is optimised to work with a given input impedance.

If the focal plane array is reconfigured by joining up sets of 4 detectors to make a 32×32 array, by connecting 2 detectors in parallel and two pairs of paralleled detectors in series, then the resistance of the quad of detectors remains the same as far as the readout amplifier is concerned, and the thermal time constant of the bridges remains the same as before. However, as 4 signals have been averaged, the noise reduces by the square root of 4, i.e. by 2. The sensitivity is thereby improved to 50 mK. It will be appreciated that the bias power to the individual detectors must be maintained to avoid a loss in response. Conveniently this may be achieved by increasing the overall bias voltage supplied to the array.

Also, as the number of nodes to be read out is now only 32×32, rather than 64×64, yet the clocking rate remains the same (as the time constants have not changed), it is possible to take 4 sets of readings of the 32×32 array in the same time as it would have taken to read out a single 64×64 array.

The four 32×32 images can thus be averaged digitally in the associated electronics, providing another factor of 2 in terms of improved noise performance. This takes the sensitivity down to 25 mK and maintains the original frame rate. Reconfiguring the focal plane minimises the signal/ image processing overhead, and enables frame rate to be maintained. Alternatively, the 32×32 array has a potential 50 mK performance at 120 Hz frame rate which may allow improved head tracking speed.

If the frame rate were then reduced by a factor of 4, a further improvement of a factor of two would be obtained, providing a 12.5 mK sensitivity at 7.5 Hz in this example. This would be very useful in an airbag head-position sensing application.

The above quoted improvements are dependent on careful design of the signal processing electronics and represent the best improvement obtainable.

One form of the invention will now be described, by way of example only, with reference to the accompanying drawings in which.

Figure 1:
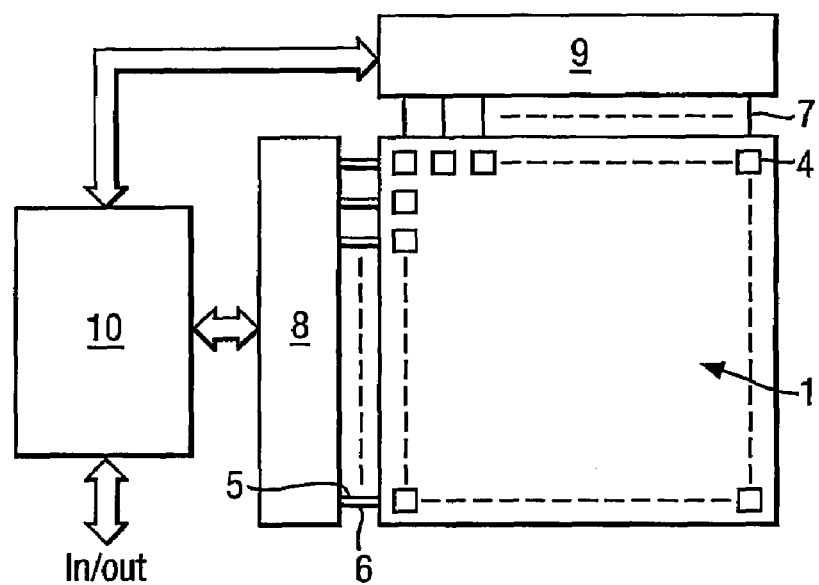
FIG. 1 is a schematic plan view of an array of detectors with associated circuitry.
Figure 2:
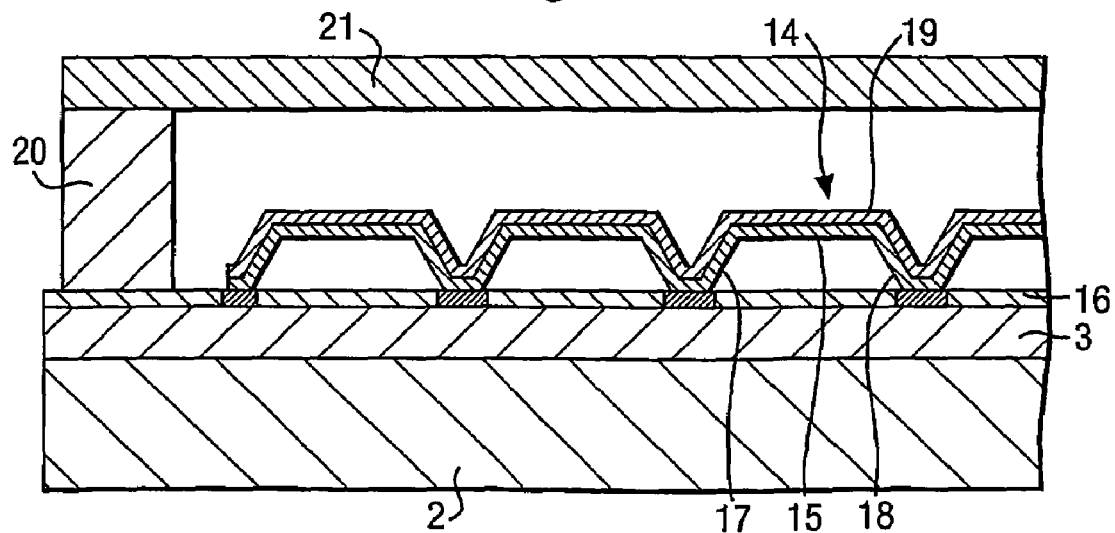
FIG. 2 is a sectional view of part of FIG. 1.

One detector array to which the present invention may be applied is shown in FIGS. 1 and 2. A thermal imaging array 1 comprises a base plate 2 of silicon onto which circuitry 3 such as amplifiers gates etc are grown. Preferably circuitry 3 includes the components to perform the process listed in the algorithm of FIG. 7. The array 1 has 4096 detectors arranged in a 64×64 array. Each detector 4 has associated therewith two row electrodes 5, 6 and a column electrode 7 for applying voltages to and reading output from each detector 4. All row electrodes 5, 6 are operated through a row driver 8, and all column electrodes 7 are operated through a column driver 9. Both drivers are controlled by a control circuit 10, which communicates to external circuitry not shown.

Each detector 4 may be made as described in WO/GB00/03243. In such a device a micro bolometer 14 is formed as a micro-bridge 15 in which a layer of e.g. titanium is spaced about 1 to 4 µm, typically 2.5 µm, from a substrate surface 16 by thin legs 17, 18. Typically the titanium is about 0.1 to 0.25 µm thick in a range of 0.05 to 0.3 µm with a sheet resistance of about 3.3 Ω/sq in a range of 1.5 to 6 Ω/sq. The titanium detector microbridge 15 is supported under a layer 19 of silicon oxide having a thickness of about λ/4 where λ is the wavelength of radiation to be detected. Such a titanium detector can be adapted to detect a variety of wavelengths which include those in the infra red radiation band between 8 and 14 µm. The infrared energy is absorbed by the combination of layers 15 and 19, and the subsequent change in temperature causes the resistance of the titanium to change. Hence measuring the detector resistance provides a value of the incident radiation amplitude.

The detectors are all contained within an airtight container with walls 20 and a lid 21 forming a window or a lens. The walls 20 may be of silicon oxide and the window 21 of germanium, silicon, or a chalcogenide glass. Typically the pressure inside the container is less than 10 Pa.

Figure 3:
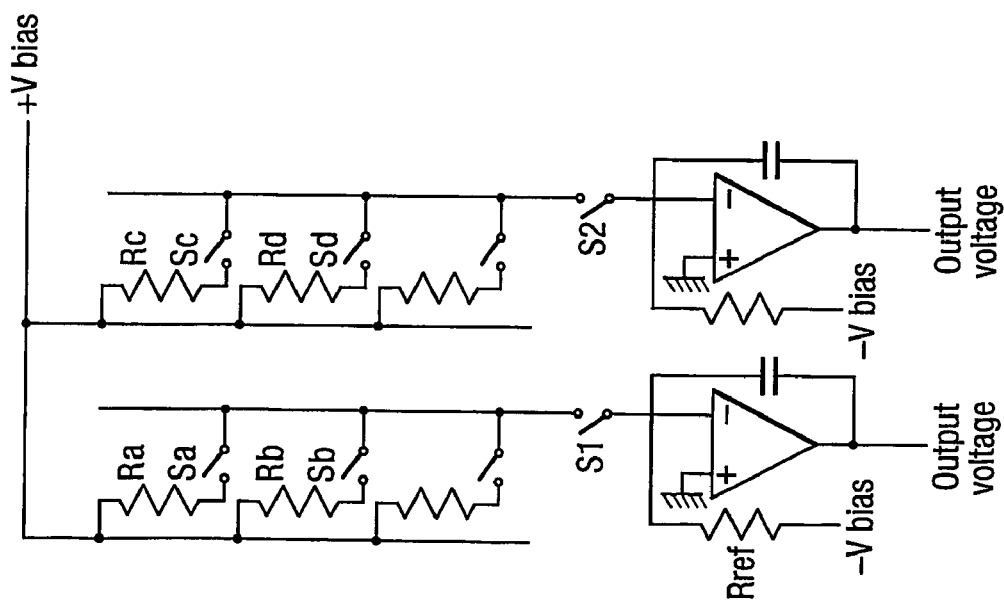
FIG. 3 is a schematic diagram showing connections to each detector for a conventional array.

FIG. 3 shows a typical conventional read out circuit. The array of resistors Ra, Rb, . . . represent pixels in the array whose resistance value changes with temperature, and hence form a thermal detector array onto which radiation can be directed.

The resistor array is biased by a voltage (+Vbias). Each detector can be read out sequentially by switching on S1 to activate the top row, and sequentially switching on Sa, Sb for the required integration time.

A balancing resistor Rref of equal nominal value to the array resistors is connected to a negative bias voltage (−Vbias) which is equal in magnitude to +Vbias.

If the array resistor, e.g. Ra, and Rref are at the same temperature, then no current is available to charge the integrating capacitor and the signal is zero. Any difference in resistance, however, is integrated over a chosen time period and represents, ideally, the temperature difference between an array resistor and the reference resistor.

The array resistors have a fixed thermal time constant which is a function of their thermal capacitance and thermal conductance. The operational amplifier will be optimised for a given input impedance, bandwidth and dynamic range.

Figure 4:
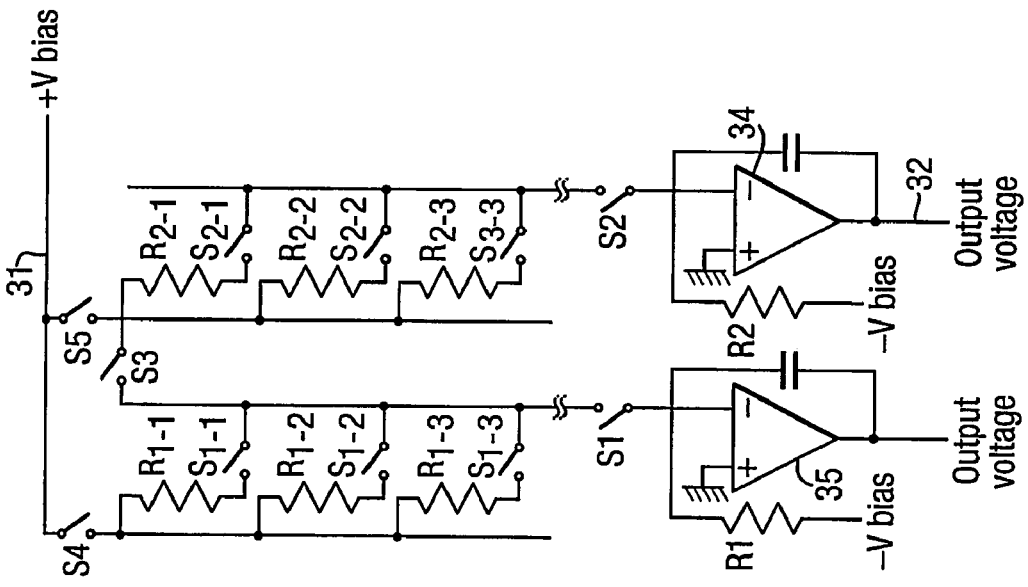
FIG. 4 is a schematic diagram showing reconfigurable connections to each detector according to a first embodiment of the present invention.

FIG. 4 shows how each detector may be readout individually as a 64×64 array and connected together in groups of four to be read out as a 32×32 array. Two lines are shown with three detectors in each. A first line of detectors is indicated by resistances $R_{1-1}$ to $R_{1-64}$ each connected at one end to a +V bias electrode 31 via a switch S4. The other ends of the resistances are connectable through switches $S_{1-1}$-$S_{1-64}$ to a readout electrode connected through a switch S1 to one end of a reference resistance R1 and to an integrating capacitor amplifier 35. The reference resistance R1 is connected to a negative bias voltage of equal amplitude to the +V bias.

Similarly, the second line of detectors has resistances $R_{2-1}$ to $R_{2-64}$ connected via switch S5 to the +V bias, and via switches $S_{2-1}$ to $S_{2-64}$, and S2 to an integrating capacitor amplifier 34, and reference resistance R2. Further switches S3 and S5 allow different combinations of connections as described below.

Figure 5:
FIG. 5 is a thermal image of a driver in an automobile taken with a 64×64 array of detectors.

A relatively high definition thermal image is achieved by allowing each detector 4 to be illuminated by the scene through the window or lens 21 and reading each detector 4 separately. This thermal radiation alters the temperature of each detector and hence varying its resistance value. Each detector in the first line is then connected in turn, via switches $S_{1-1}$-$S_{1-64}$, to the amplifier 35 for an integration time. The amplifier 34 output voltage is thus proportional to the temperature of each detector. Similarly all other lines are read out. The collective output of all 64×64 detectors gives an electrical picture of the thermal scene to a good standard of detail. An example of such a 64×64 array is shown in FIG. 5.

In order to change the focal plane array to effectively contain a quarter of the number of pixels, four array resistors can be connected in a serial/parallel fashion by introducing additional switches S3 and S5 as shown in FIG. 4.

If S1 and S5 are kept open circuit and S2, S3, and S4 are closed, then the array can be scanned by closing groups of four pixel level switches at once—i.e., close $S_{1-1}$, $S_{1-2}$, $S_{2-1}$ and $S_{2-2}$ to read a "super pixel" composed of the four resistors $R_{1-1}$, $R_{1-2}$, $R_{2-1}$ and $R_{2-2}$, whose combined resistance is nominally equal to Rref, and whose thermal time constant is unchanged.

The result is reduced noise in the "super pixel" by a factor of 2 (noise improved by square root of 4), and an increased frame rate by a factor of 4 (as there are only a quarter of the number of pixels to read out at the same sampling rate).

In order to maintain the performance of the array using pulse bias method, it may be necessary to increase the bias voltages by a factor of 2 to achieve a similar current flow through the each element. This may require the row amplifier to have sufficient dynamic range.

S3 introduces a small but and additional resistance in the "superpixel" and this could be corrected for by adjusting the bias voltages accordingly, for example, increasing +Vbias slightly, or by introducing a matching switch in series with Rref.

Figure 6:
FIG. 6 is a thermal image of a driver in an automobile taken with a 32×32 array of detectors.

The result of connecting detector pixels into groups of four is a 32×32 array; one example of this is shown in FIG. 6. Comparing it with the 64×64 array of FIG. 5, loss of definition is clear. Higher definition is useful in locating a head position, with the lower definition but faster readout image used for quick calculation e.g. in an accident.

FIGS. 8a-d show another arrangement for connecting detector pixels into groups. A 64 by 64 line and column array of pixels contains a first line of detector resistors $R_{1-1}$ to $R_{1-64}$ with successive further rows down to a sixty fourth row $R_{64-1}$ to $R_{64-64}$, although only a four column by three row section is shown. A bias voltage line Vbias connect to each column of resistors through switches $a_1$ to $a_{64}$. Output from each resistor to a column output line is through a switch marked $c_{1-1}$ to $c_{64-64}$. Output from each column is via a switch $d_1$ to $d_{64}$. Switches $b_1$ to $b_{63}$ connect the output line of one column to the bias line of its neighbour.

Figure 8A:
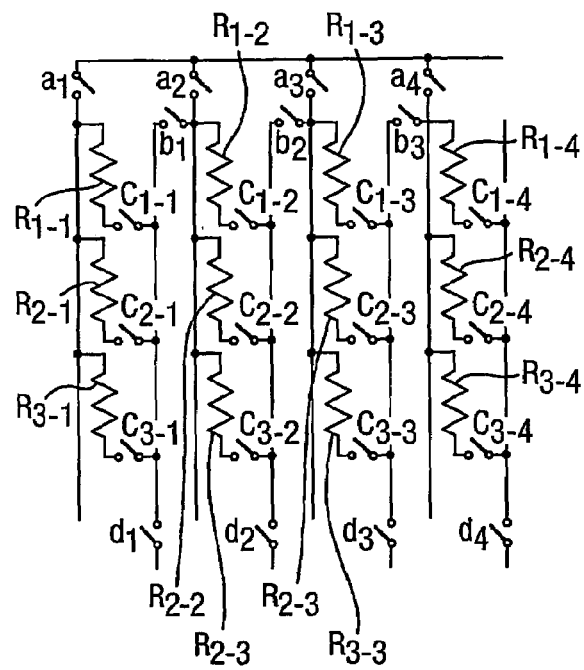
FIG. 8 is a schematic diagram showing reconfigurable connections to each detector according to another embodiment of the present invention.
Figure 8B:
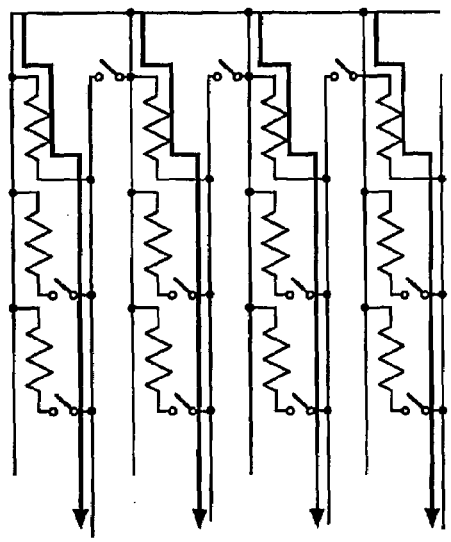

To operate at maximum resolution output is taken from each resistor R individually as shown in FIG. 8b. All switches $a_1$ to $a_{64}$ and $d_1$ to $d_{64}$ are closed. Each line is read out successively a line at a time by closing all c switches in a line until all lines have been read.

Figure 8C:
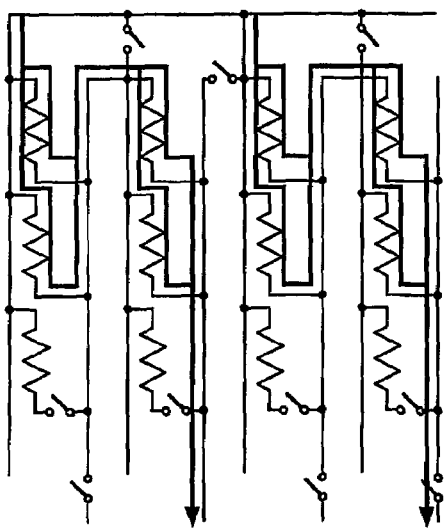

To operate at ¼th resolution, the resistors are connected together in groups of 4 in a serial and parallel arrangement so that their combined impedance is about that of a single resistor. This is shown in FIG. 8c where resistors $R_{1-1}$, $R_{1-2}$, $R_{2-1}$ and $R_{2-2}$ are connected together closing switches $a_1$, $b_1$, $c_{1-1}$, $c_{1-2}$, $c_{2-1}$, $c_{2-2}$, $d_2$; the remaining resistors are similarly connected together.

Figure 8D:
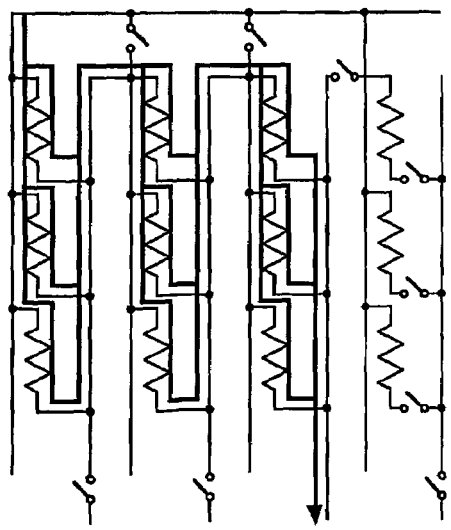

To operate at ⅑th resolution, the resistors are connected together in groups of 9 in a serial and parallel arrangement so that their combined impedance is about that of a single resistor. This is shown in FIG. 8d where resistors $R_{1-1}$, to $R_{1-3}$, $R_{2-1}$ to $R_{2-3}$, $R_{3-1}$, to $R_{3-3}$ are connected together closing switches $a_1$, $b_1$, $b_2$, $c_{1-1}$, to $c_{1-3}$, $c_{2-1}$, to $c_{2-3}$ to $c_{3-3}$ d3; the remaining resistors are similarly connected together in groups of 6.

In a similar manner, the resistors may be connected together in groups of 4 by 4, 8 by 8, 16 by 16, and 32 by 32; which each group having the same nominal impedance as a single resistor. The resistors may also be arranged in groups of e.g. 5 by 5 or 6 by 6 etc. but this results in some pixels not being used, as is the case with the 3 by 3 array of FIG. 8d where only 63 resistors in each line are used.

In the different arrangements shown, the resistors are grouped with adjacent resistors connected together. It is also possible to form groups but without connecting adjacent resistors. For example a 4 element group could be formed by connecting together resistors $R_{1-1}$, $R_{1-3}$, $R_{3-1}$, $R_{3-3}$ with other resistors connected together in a similar manner and the complete array read out. Such an arrangement could interleaf, with a different grouping of 4 elements. For example groups formed by $R_{1-2}$, $R_{1-4}$, $R_{3-2}$, $R_{3-4}$, and/or formed by $R_{2-1}$, $R_{2-3}$, $R_{4-1}$, $R_{4-3}$ etc.

To increase sensitivity using off-chip techniques, digital image processing could be used to digitally average groups of four pixels. This would improve the noise by a factor of 2 but would not increase the frame rate. The present invention provides in addition to this improved noise value a faster frame rate (if required), or using digital averaging of the 4 frames obtained a further improvement of a factor of 2 in signal to noise. Off chip temporal averaging of frames means that the increase in effective time constant creates blurring in the image which is undesirable.

The technique of the present invention is twice as good in terms of noise, and permits the option of a four-fold increase in frame rate over the competing off-chip digital techniques. These are very useful advantages that allow lens system costs to be reduced and rapid information gathered when needed for fast moving events.

Figure 7:
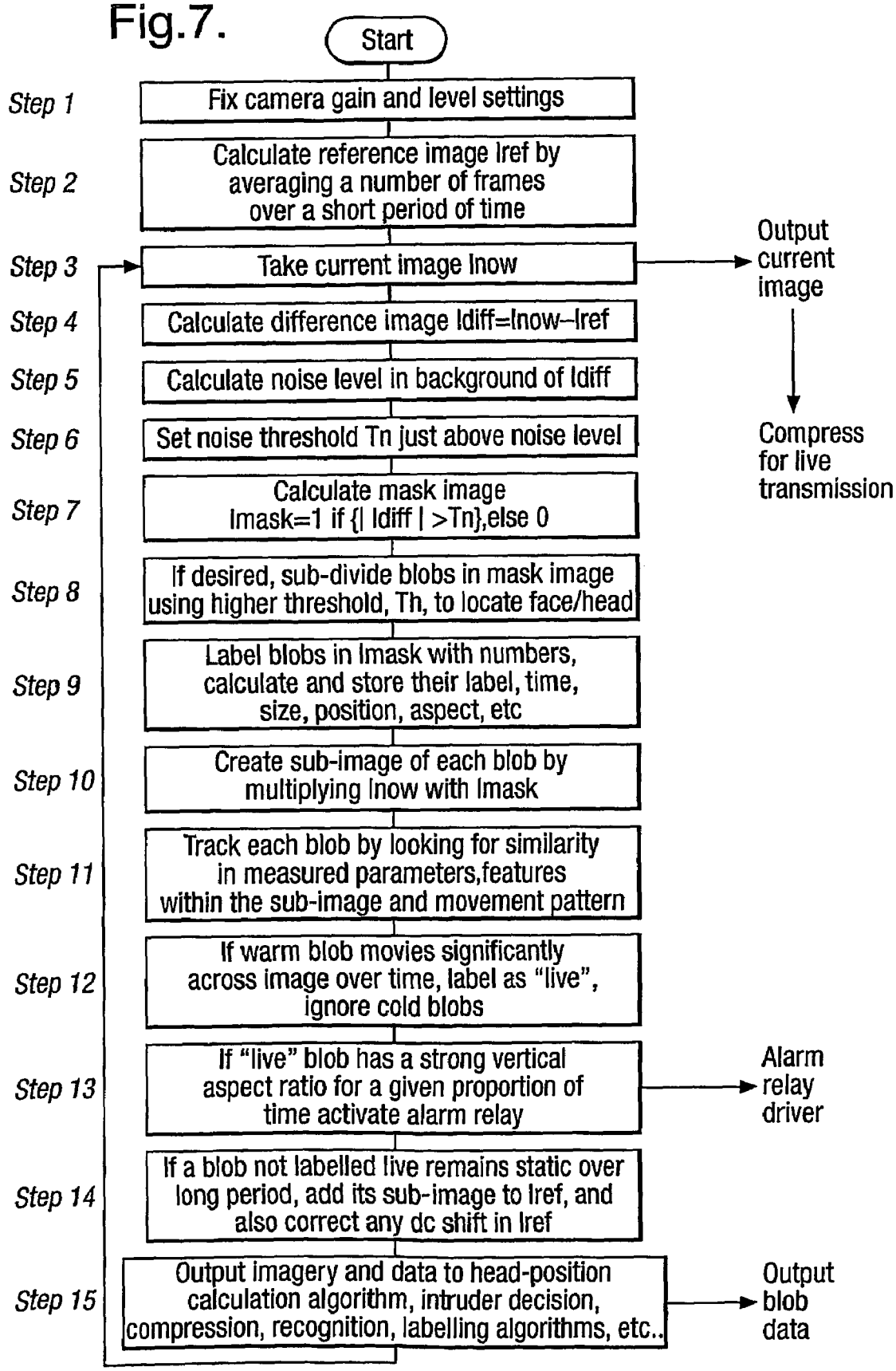
FIG. 7 is an algorithm showing the steps taken in processing the output of a detector array.

An example of the steps useful in processing the output of the detector array is shown in FIG. 7.

The invention claimed is:

1. A reconfigurable detector array comprising:
   an array of resistance bolometer detectors,
   a plurality of switchable connections for connecting together separate detectors therein into at least one larger group of detectors, wherein, the plurality of switchable connections are configurable such that the number of detectors comprising the at least one larger group is variable, and so as to enable separate detectors to be read individually or the at least one larger group of detectors to be read, wherein the plurality of switchable connections are configured so as to ensure that, in use, the electrical impedance of the at least one larger group of detectors is the same as that of a single detector.

2. The array of claim 1 wherein, the switchable connections are configured such that the at least one larger group of detectors comprises one of:
   (i) a plurality of sub-groups of detectors connected together electrically in series, each sub-group comprising a plurality of detectors connected together electrically in parallel; and
   (ii) a plurality of sub-groups of detectors connected together electrically in parallel, each sub-group comprising a plurality of detectors connected together electrically in series.

3. The array of claim 1 wherein the array is an array of thermal detectors sensitive within the range 3-14 µm.

4. The array of claim 1 comprising an x by y array of detectors and wherein the value of at least one of x and y lies in the range 24 to 96 inclusive.

5. The array of claim 1 arranged on a substrate, wherein the substrate carries electronic circuitry for processing the outputs of each detector and for reconfiguring the array into groups of detectors.

6. The array of claim 5 wherein the array and substrate are encapsulated in a single module with the detectors isolated from ambient conditions.

7. The array of claim 1 wherein the detectors may be connected together in groups of four adjacent detectors giving a 2×2 arrangement.

8. The array of claim 1 wherein the detectors may be connected together in groups of sixteen adjacent detectors giving a 4×4 arrangement.

9. The array of claim 1 and including means for directing a scene onto the array.

10. A reconfigurable detector array comprising:
    an array of separate resistance bolometer detectors; and a plurality of switchable connection means for variably connecting together said separate detectors into at least one larger group of detectors and for reading separate detectors individually or in said at least one larger group, wherein the plurality of switchable connections are configured to ensure that electrical impedance of said at least one larger group of detectors is substantially the same as impedance of a single detector.

11. The array of claim 10, wherein the switchable connections are configured such that the at least one larger group of detectors comprises one of:
(i) a plurality of sub-groups of detectors connected together electrically in series, each sub-group comprising a plurality of detectors connected together electrically in parallel; and
(ii) a plurality of sub-groups of detectors connected together electrically in parallel, each sub-group comprising a plurality of detectors connected together electrically in series.

12. The array of claim 10, wherein the array is an array of thermal detectors sensitive within the range 3-14 μm.

13. The array of claim 10 comprising an x by y array of detectors and wherein the value of at least one of x and y lies in the range 24 to 96 inclusive.

14. The array of claim 10 arranged on a substrate, wherein the substrate carries electronic circuitry far processing the outputs of each detector and for reconfiguring the array into groups of detectors.

15. The array of claim 10, wherein the detectors may be connected together in groups of four adjacent detectors giving a 2×2 arrangement.

16. The array of claim 10, wherein the detectors may be connected together in groups of sixteen adjacent detectors giving a 4×4 arrangement.

17. The array of claim 10 and including means for directing a scene onto the array.

18. The array of claim 14, wherein the array and substrate are encapsulated in a singe module with the detectors isolated from ambient conditions.

* * * * *